(12) United States Patent
Hosey

(10) Patent No.: US 10,002,263 B2
(45) Date of Patent: Jun. 19, 2018

(54) COMMUNICATIONS BUS LINE ISOLATOR

(71) Applicant: Honeywell International Inc., Morristown, NJ (US)

(72) Inventor: Mark Alexander Hosey, East Kilbride (GB)

(73) Assignee: HONEYWELL INTERNATIONAL INC., Morristown, NJ (US)

( * ) Notice: Subject to any disclaimer, the term of this patent is extended or adjusted under 35 U.S.C. 154(b) by 282 days.

(21) Appl. No.: 15/071,836

(22) Filed: Mar. 16, 2016

(65) Prior Publication Data

US 2017/0270321 A1 Sep. 21, 2017

(51) Int. Cl.
| | |
|---|---|
| *G06F 21/75* | (2013.01) |
| *H04L 12/40* | (2006.01) |
| *G06F 21/86* | (2013.01) |
| *G06F 13/40* | (2006.01) |
| *G06F 13/20* | (2006.01) |
| *G06F 13/10* | (2006.01) |

(52) U.S. Cl.
CPC ............ *G06F 21/75* (2013.01); *G06F 13/102* (2013.01); *G06F 13/20* (2013.01); *G06F 13/4068* (2013.01); *G06F 21/86* (2013.01); *H04L 12/40169* (2013.01)

(58) Field of Classification Search
CPC ...... G06F 21/75; G06F 21/86; G06F 13/4068; G06F 13/20; G06F 13/102; H04L 12/40169
See application file for complete search history.

(56) References Cited

U.S. PATENT DOCUMENTS

| | | |
|---|---|---|
| 5,933,591 A | 8/1999 | Mazzurco |
| 5,999,389 A | 12/1999 | Luebke et al. |

(Continued)

FOREIGN PATENT DOCUMENTS

EP 2 760 165 A2 7/2014

OTHER PUBLICATIONS

Extended European search report from corresponding EP patent application 17161040.5, dated May 19, 2017.

(Continued)

*Primary Examiner* — Darren B Schwartz
(74) *Attorney, Agent, or Firm* — Husch Blackwell LLP

(57) ABSTRACT

A communications bus line isolator is provided. In some embodiments, a first side of the communications bus isolator can be coupled to a first device via first communications bus cabling, a second side of the communications bus isolator can be coupled to a second device via second communications bus cabling, and, when the communications bus isolator detects a fault on or tampering or interference with the second communications bus cabling or the second device, the communications bus isolator can isolate the first communications bus cabling from the second communications bus cabling. In some embodiments, when the first device detects a continuous fault on or continuous tampering or interference with the second communications bus cabling or the second device, the first device can transmit a signal to the communications bus isolator, instructing the communications bus isolator to actively disable receivers on the second side of the communications bus isolator.

16 Claims, 5 Drawing Sheets

(56) References Cited

U.S. PATENT DOCUMENTS

| | | | | |
|---|---|---|---|---|
| 6,636,921 B1* | 10/2003 | Scholhamer | ........... | G06F 13/404 710/305 |
| 6,859,853 B2* | 2/2005 | Bassett | ............... | G06F 13/4072 710/305 |
| 7,941,253 B1* | 5/2011 | Brant | ..................... | B63H 25/42 701/21 |
| 2002/0078289 A1* | 6/2002 | Morrow | .............. | G06F 13/4045 710/300 |
| 2002/0108076 A1* | 8/2002 | Barenys | ................ | G06F 11/221 714/43 |
| 2004/0168008 A1* | 8/2004 | Benson | ................. | G06F 13/409 710/306 |
| 2005/0129057 A1* | 6/2005 | Chen | ..................... | H04L 49/357 370/462 |
| 2005/0180065 A1* | 8/2005 | Chapuis | .................... | G06F 1/26 361/18 |
| 2014/0284998 A1* | 9/2014 | Brennan | ................. | B63B 35/00 307/9.1 |

OTHER PUBLICATIONS

Thomas Kugelstadt, Data-rate independent half-duplex repeater design for RS-485, Texas Instruments Incorporated, Interface (Data Transmission), Copyright @ 2012.

Honeywell Security, Galaxy Flex V3 User Guide, 800-09957-01 Rev A1, Oct. 6, 2015.

Honeywell Security, Galaxy Flex V3 Installer Manual, 800-11184-01 Rev A1, Oct. 6, 2015.

\* cited by examiner

COMMUNICATIONS BUS LINE ISOLATOR

FIELD

The present invention relates generally to communications buses. More particularly, the present invention relates to a communications bus line isolator.

BACKGROUND

Systems are known that use a single communications bus to transmit communications signals between a control panel and remote peripheral devices. However, such systems can be rendered inoperable when a fault develops or is induced by deliberate interference or tampering on the communications bus wiring or on a bus interface of one of the peripheral devices. For example, on a four wire RS485 bus, connecting the A, B, power, or ground connections improperly will prevent a control panel from receiving communications signals indicative of polling events from peripheral devices as well as any other data signals transmitted between the control panel and peripheral devices connected to the bus.

Although a communications bus is a single unit, it is to be understood that internal communications bus cabling, as used herein, can include the portion of the bus cabling within a control panel enclosure, and that external communications bus cabling, as used herein, can include the portion of the bus cabling that extends outside of the control panel enclosure. A control panel can be connected to one or more of an Ethernet module, a GSM/GPRS module, a modem, or other communications device that can be used to report an alarm, fault, or status condition to a remote receiver, such as a reporting station. Typically, each of these communications devices is housed within the control panel enclosure and is connected to the control panel via the internal communications bus cabling. However, the control panel and the communications devices housed within the control panel enclosure can also be connected to peripheral devices, such as keypads and sensors, via external communications bus cabling. In known systems, any fault on or malicious tampering or interference with the external communications bus cabling or peripheral devices attached to the external communications bus cabling can render the entire communications bus, including the internal communications bus cabling, inoperable, thereby preventing the control panel from communicating alarms, faults, or status conditions to a remote receiver via one or more of the communications devices connected to the internal communications bus cabling.

FIG. 1 is a block diagram of system 100 that includes a communications bus as known in the art. As seen, the system 100 can include a control panel 110, and one or more communications devices 120 housed within a control panel enclosure 130 and connected to the control panel via internal communications bus cabling 140. Each of the control panel 110 and the communications devices 120 can also be connected to one or more peripheral devices 150 that are located outside of the control panel enclosure 130 via external communications bus cabling 160. As described above, communications between the control panel 110 and the communications devices 120 via the internal bus cabling 140 are vulnerable to faults on or tampering or interference with the external bus cabling 160 and the peripheral devices 150.

Some systems have been developed to overcome the susceptibility to faults on or tampering or interference with known communications buses. For example, some control panels include a communications device housed within the control panel enclosure and connected to a communications bus, as described above, as well as a dedicated communications device, such as a POTS telecommunications device or modem, connected directly to the control panel and not via the communications bus. Accordingly, when tampering occurs on the external cabling of the communications bus, thereby rendering communications between the control panel and the communications devices connected to the communications bus inoperable, the control panel can still communicate via the dedicated communications device.

Unfortunately, not all control panels include or can support a dedicated communications device, such as a modem. For example, some control panels do not have access to a land line telephone connection to operate with an onboard modem. Accordingly, such control panels remain susceptible to faults on or tampering or interference with a communications bus, and systems that include such control panels may become incapable of reporting alarm, fault, or status conditions, thereby making such systems incapable of protecting, monitoring, and controlling an associated monitored region in the manner expected by a user.

Other systems that have been developed to overcome the susceptibility to faults on or tampering or interference with known communications buses include control panels that include two separate communications buses: one communications bus for connecting the control panel to devices internal to the control panel enclosure and another communications bus for connecting the control panel to devices external to the control panel enclosure. Undesirably, such systems require additional control panel resources, such as a second microprocessor, UART, memory device, and the like, as well as software and other components to support a second bus interface.

In view of the above, there is a continuing, ongoing need for improved systems and methods.

DETAILED DESCRIPTION

Figure 1:
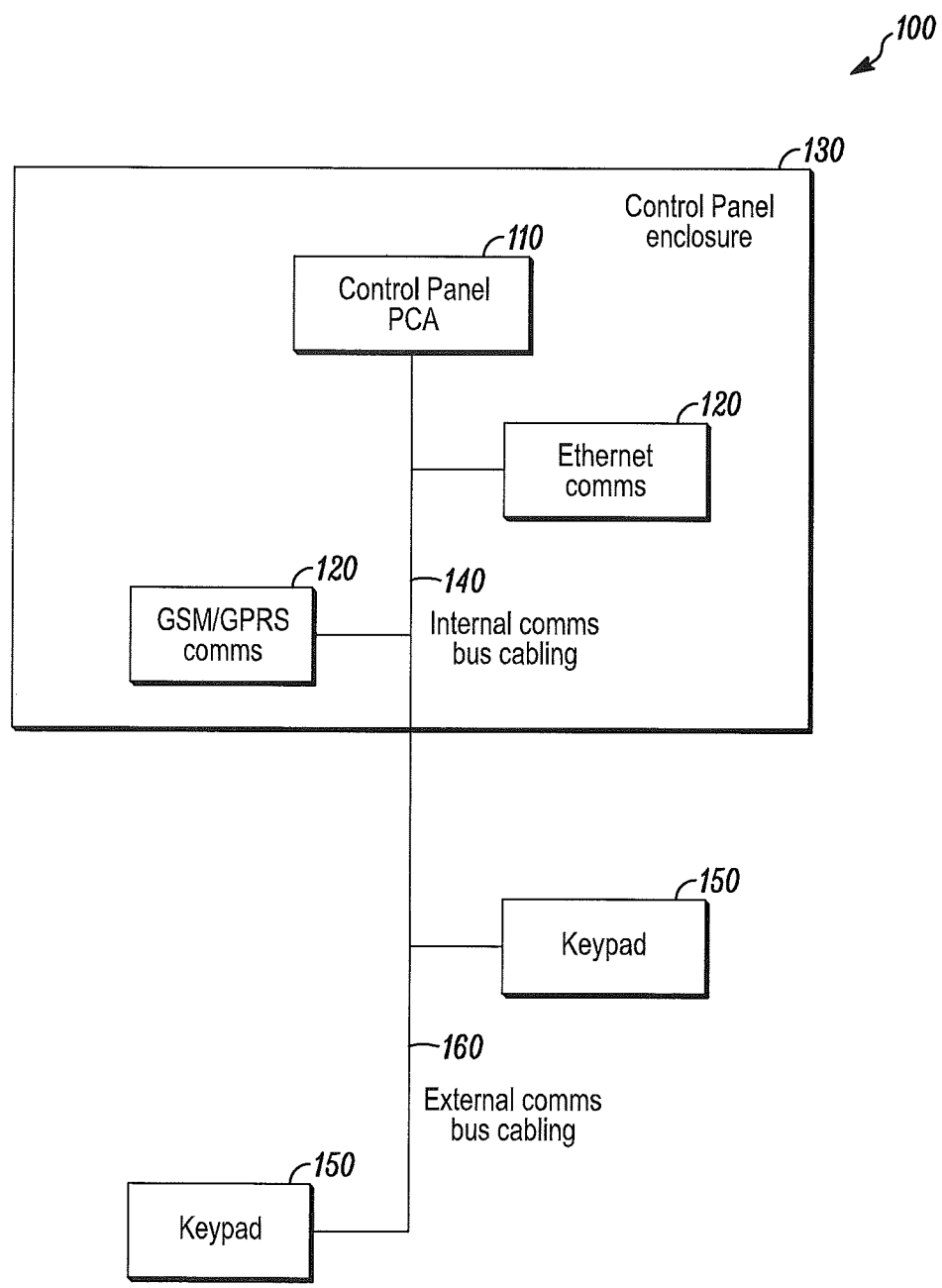
FIG. 1 is a block diagram of system that includes a communications bus as known in the art.

While this invention is susceptible of an embodiment in many different forms, there are shown in the drawings and will be described herein in detail specific embodiments thereof with the understanding that the present disclosure is to be considered as an exemplification of the principles of the invention. It is not intended to limit the invention to the specific illustrated embodiments.

Embodiments disclosed herein can include a communications bus line isolator. For example, internal communications bus cabling, to which communications devices or other status reporting peripheral devices housed within a control panel enclosure can be connected, can be isolated from external communications bus cabling. In some embodiments, such isolation can be achieved by employing a communications bus repeater that automatically passes data signals from one side of the bus, for example, the internal bus cabling, to the other side of the bus, for example, the external bus cabling, and vice versa. However, the repeater can prevent bus faults on or deliberate interference or tampering with the external bus cabling or peripheral devices connected to the external bus cabling from disabling communications between the control panel and the communications devices or other status reporting peripheral devices connected to the internal bus cabling.

Advantageously, the communications bus line isolator described and disclosed herein can be included in systems and control panels during production or installation or can be retrofitted to existing systems when the need arises to protect the integrity of portions of communications bus cabling. Furthermore, the communications bus line described and disclosed herein advantageously need not be integrated into a control panel or use any additional resources of a control panel outside of what is included in a known control panel.

As explained above, the communications bus isolator described and disclosed herein can include a communications bus repeater, and in some embodiments, the communications bus repeater can include a passive transparent communications bus repeater to isolate the internal bus cabling from the external bus cabling. It is be understood that a repeater, as used herein, can include a device that passes information or signals without a change of protocol from one set of wires to another set of wires and without any discernible transmission or reception delays. It is also to be understood that a passive repeater, as used herein, can include a device that carries out the function of a repeater without the help of a microprocessor, memory device, or other devices that enable data buffering or data manipulation. Furthermore, it is to be understood that a transparent repeater, as used herein, can include a device that need not address data signals prior to transfer thereof. Instead, any data signal appearing on a first of a transparent repeater's bus connections appears, substantially instantaneously, on a second of the transparent repeater's bus connections, whether or not the data signal is intended to be received by a device connected to the bus cabling that is connected to the second of the transparent repeater's bus connections.

In some embodiments, a communications bus repeater, for example, a passive transparent communications repeater, can be spliced into a communications bus such that a first side of the repeater is connected to internal communications bus cabling, for example, cabling internal to a control panel enclosure and connected to devices internal to the control panel enclosure, and a second side of the repeater is connected to external communications bus cabling, for example, cabling external to the control panel enclosure and connected to peripheral devices external to the control panel enclosure. In some embodiments, the repeater can be located within the control panel enclosure together with the internal communications bus cabling. Accordingly, both the repeater and the internal bus cabling can be protected from transient interference or tampering that is external to the control panel enclosure. It is to be understood that transient interference or tampering, as used herein, can include inducing a fault on external communications bus cabling that renders the communications bus inoperable, wherein, once induced, the fault is static and unchanging.

In some embodiments, the repeater as disclosed and described herein can use voltage transitions to detect and react to the presence of data traffic on the associated communications bus. For example, a predetermined period of time after a voltage transition ceases, that is, after a time out period, the repeater can enter a quiescent listening state during which the repeater isolates the internal bus cabling and external bus cabling from one another. Because any fault induced by a transient interference or tampering gives rise to a single voltage transition, in some embodiments, operation of the internal bus cabling will only be interrupted during the repeater's time out period, after which the internal bus cabling can resume normal operation. Indeed, in the absence of any further voltage transitions, the external bus cabling can be isolated from the internal bus cabling.

Contrary to transient interfering or tampering, continuous interfering or tampering, as used herein, can include inducing a fault on external communications bus cabling that renders the communications bus inoperable, wherein the fault includes repeated or continuous interfering or tampering events, such as, for example, voltage transitions. In some embodiments, the repeater as disclosed and described herein can facilitate the control panel detecting the continuous interfering or tampering, and upon such detection, actively disabling or instructing the repeater to actively disable the repeater's external bus cabling receivers. For example, the control panel can detect unsolicited voltage transitions on external bus cabling, for example, activity that is not responsive to any device polling events and that is disrupting communications on internal bus cabling. Responsive to such detection, the control panel can assert or activate an output of the control panel that is dedicated to bus fault isolation and that is connected to the repeater's circuits that enable or disable the repeater's external bus cabling receivers. Accordingly, the control panel can actively switch the receiver off to isolate internal bus cabling from external bus cabling and to give the control panel free and unfettered access to communications devices connected to the internal bus cabling.

It is to be understood that the repeater itself can also detect continuous interference and tampering, and upon such detection protect the internal bus cabling from transient interference or tampering as described above. However, the repeater can subsequently protect the internal bus cabling from continuous interference or tampering upon receipt of a signal from the control panel with instructions to disable to the repeater's external bus cabling receivers and thereby isolate the external bus cabling.

It is also to be understood that a repeater as described and disclosed herein can be used to protect communications on cabling on either side of the repeater from faults, interference, or tampering on the other side of the repeater. For example, in addition to or as an alternative to a communications bus repeater connected to both internal and external bus cabling as described above and herein, in some embodiments, a communications bus repeater, for example, a passive transparent communications repeater, can be spliced into a communications bus such that a first side of the repeater is connected to a first portion of external communications bus cabling, for example, cabling connected to a first plurality of peripheral devices, and a second side of the repeater is connected to a second portion of external communications bus cabling, for example, cabling connected to a second plurality of peripheral devices. Accordingly, one portion of the external bus cabling connected to one plurality of peripheral devices can be protected from interference or tampering on the other portion of the external bus cabling or the other portion of peripheral devices. It is to be understood that such protection can be transient or continuous as described above and herein. However, when the protection is continuous, the repeater external to the control panel can also be connected to a controller that is subordinate to the control panel, for example, a remote input/output module (RIO), and the subordinate controller can transmit a signal to the repeater external to the control panel to actively disable the external repeater's bus cabling receivers connected to the other portion of the external bus cabling.

Figure 2:
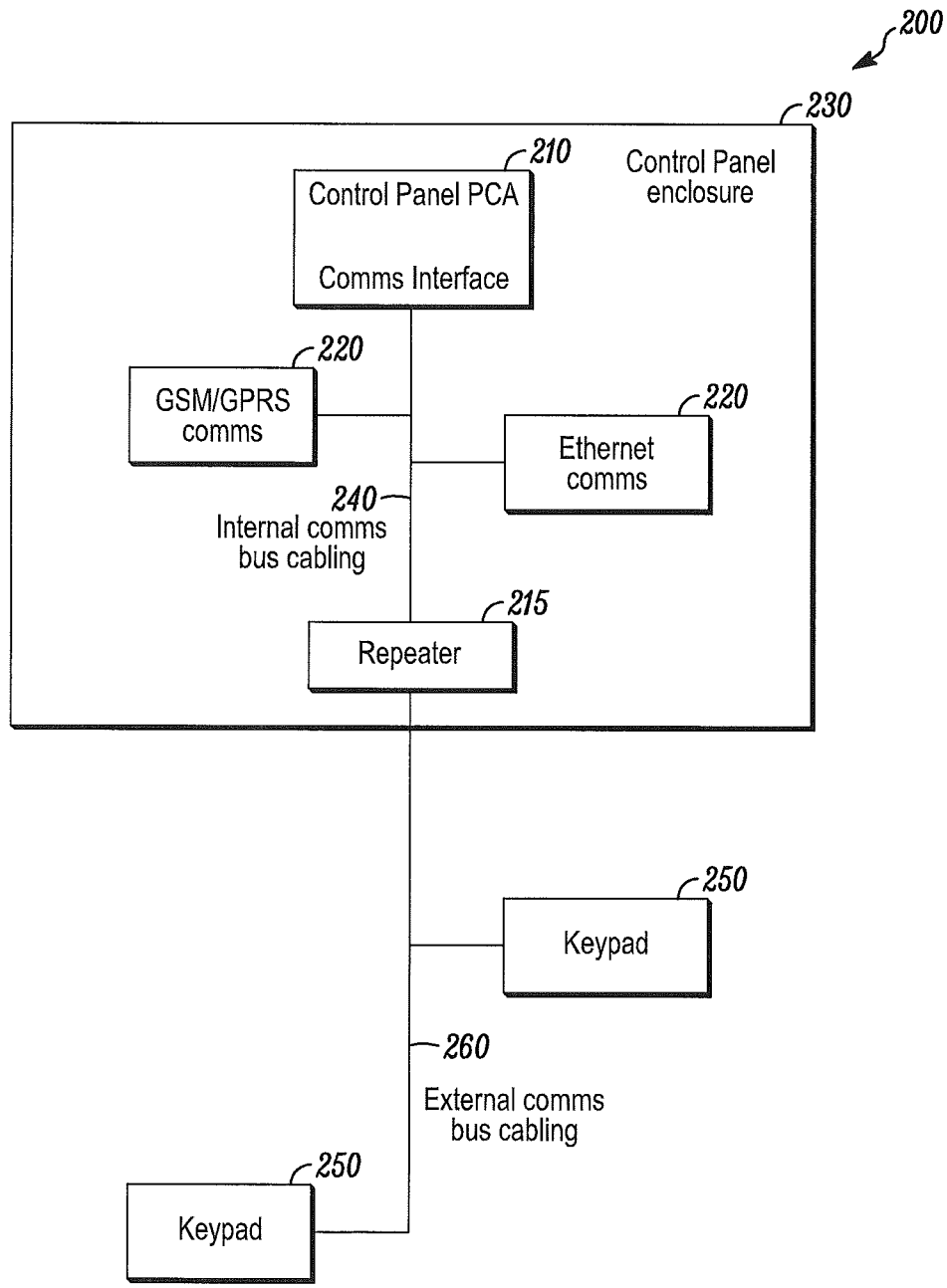
FIG. 2 is a block diagram of a system that includes a communications bus and a communications bus line isolator in accordance with disclosed embodiments.

FIG. 2 is a block diagram of a system 200 that includes a communications bus and a communications bus line isolator in accordance with disclosed embodiments. As seen, the system 200 can include a control panel 210 and one or more communications devices 220 housed within a control panel enclosure 230 and connected via internal communications bus cabling 240. A repeater 215 as disclosed and described herein can also be included within the control panel enclosure 230, and a first side of the repeater 215 can be connected to the internal bus cabling 240.

A second side of the repeater 215 can be connected to external communications bus cabling 260, which can also be connected to one or more peripheral devices 250 that are located outside of the control panel enclosure 230. Each of the control panel 210 and the communications devices 220 can communicate with the peripheral devices 250 via the repeater 215. However, when the repeater 215 detects a transient fault on or transient tampering or interference with the external bus cabling 260 or one of the peripheral devices 250, the repeater 215 can isolate the external bus cabling 260 from the internal bus cabling 240, thereby protecting the internal bus cabling 240 from the transient faults or transient tampering or interference.

Figure 3:
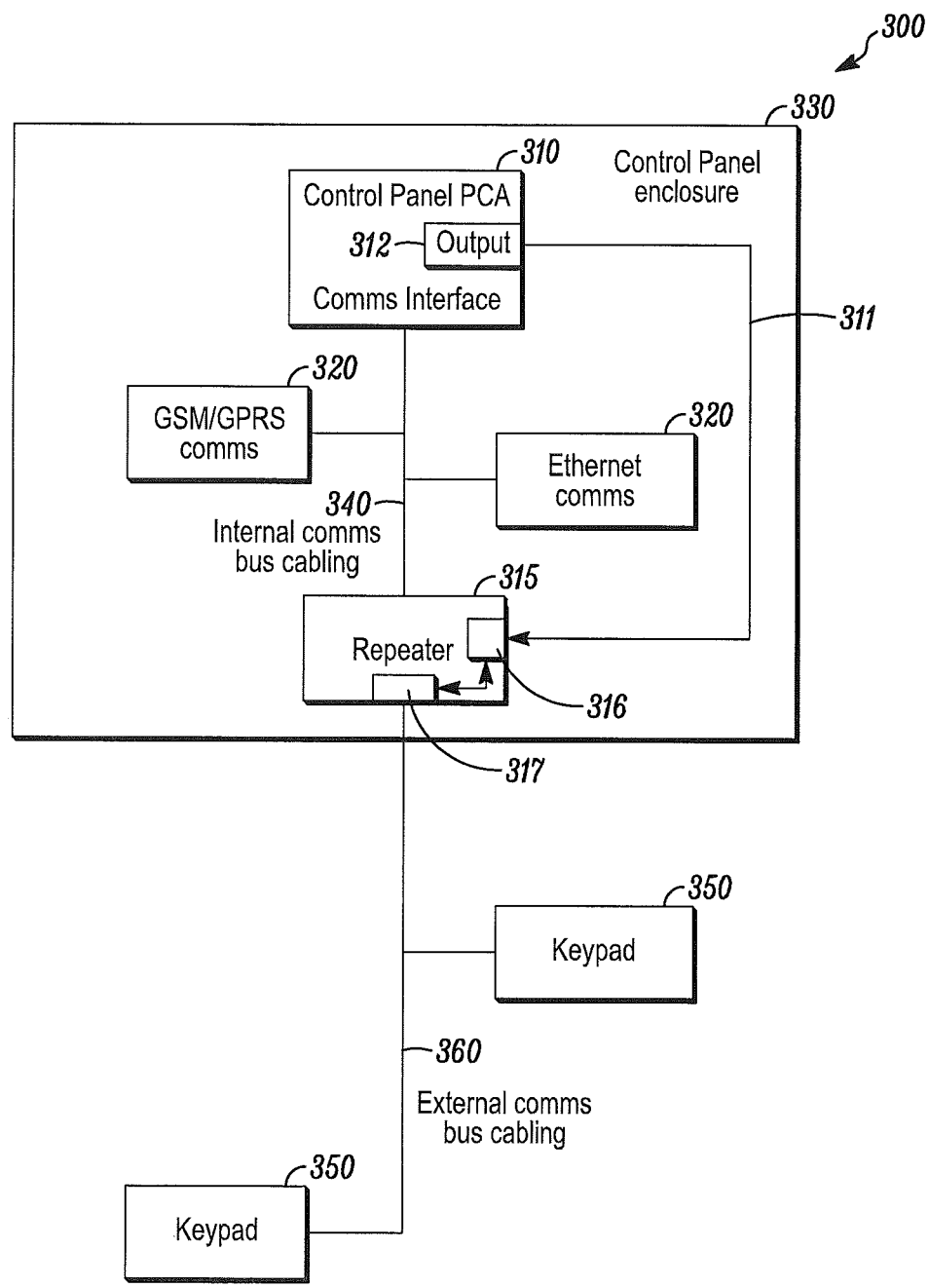
FIG. 3 is a block diagram of a system that includes a communications bus and a communications bus line isolator in accordance with disclosed embodiments.

FIG. 3 is a block diagram of another system 300 that includes a communications bus and a communications bus line isolator in accordance with disclosed embodiments. As seen, the system 300 can include a control panel 310 and one or more communications devices 320 housed within a control panel enclosure 330 and connected via internal communications bus cabling 340. A repeater 315 as disclosed and described herein can also be included within the control panel enclosure 330, and a first side of the repeater 315 can be connected to the internal bus cabling 340. As seen, the repeater 315 can also be connected to the control panel 310 via a communications line 311, a control panel output 312 that is dedicated to bus fault isolation, and circuits 316 in the repeater 315 that enable or disable external bus cabling receivers 317 of the repeater 315.

A second side of the repeater 315 can be connected to external communications bus cabling 360 via the external bus cabling receivers 317, and the external bus cabling 360 can also be connected to one or more peripheral devices 350 that are located outside of the control panel enclosure 330. Each of the control panel 310 and the communications devices 320 can communicate with the peripheral devices 350 via the repeater 315. However, when the repeater 315 detects any fault on or tampering or interference with the external bus cabling 360 or one of the peripheral devices 350, the repeater 315 can isolate the external bus cabling 360 from the internal bus cabling 340, thereby protecting the internal bus cabling 340 from transient faults or transient tampering or interference. Moreover, when the control panel 310 detects a continuous fault on or continuous tampering or interference with the external bus cabling 360 or one of the peripheral devices 350, the control panel 310 can transmit a signal to the repeater 315 via the control panel output 312, the communications line 311, and the circuits 316 of the repeater 315 instructing the repeater 315 to disable the external bus cabling receivers 317 of the repeater 315, thereby protecting the internal bus cabling 340 from the continuous fault or continuous tampering or interference.

Figure 4:
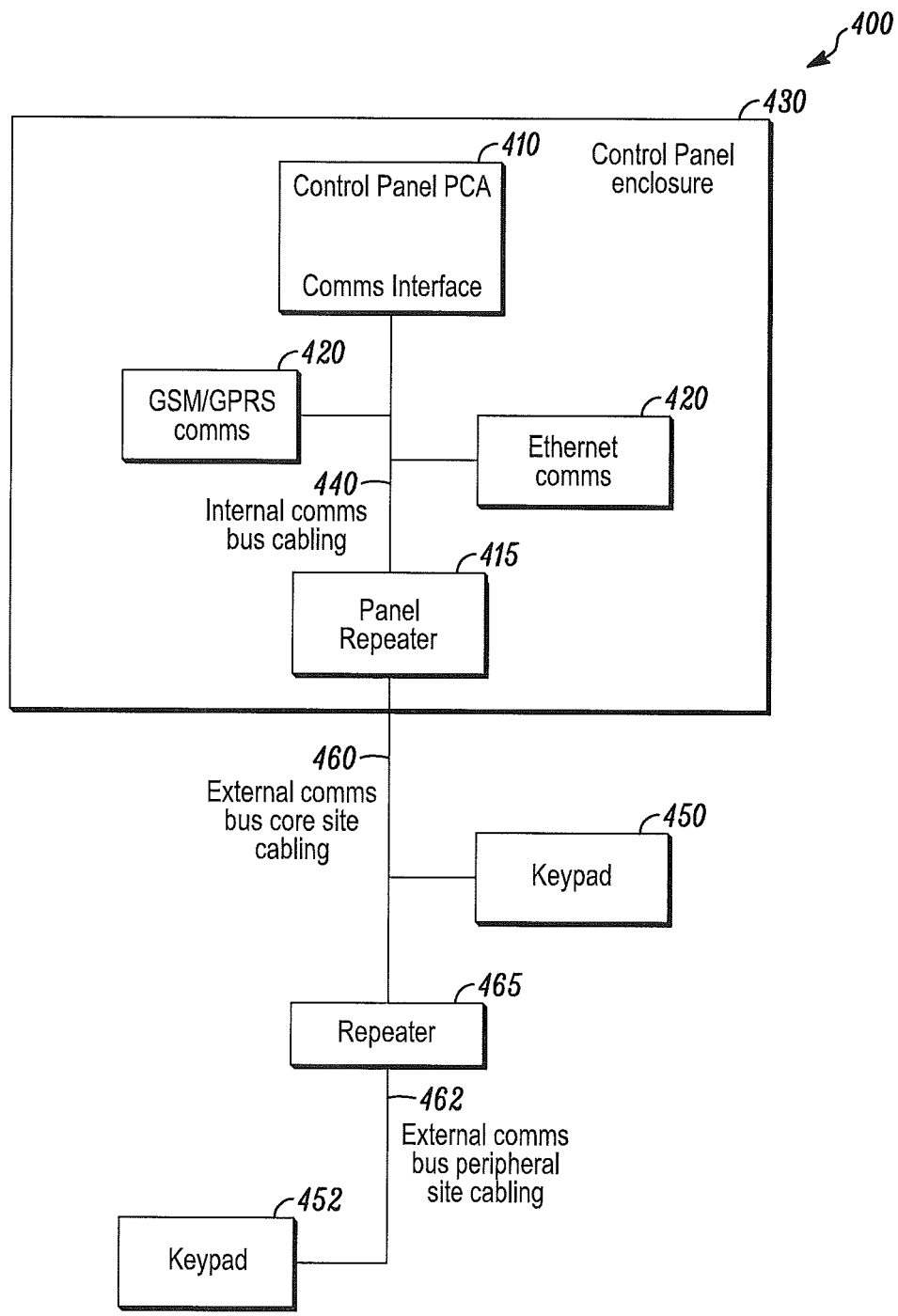
FIG. 4 is a block diagram of a system that includes a communications bus and internal and external communications bus line isolators in accordance with disclosed embodiments.

FIG. 4 is a block diagram of a system 400 that is similar to the system 200 of FIG. 2 except that the system 400 also includes an external repeater 465 such that a first side of the repeater 465 is connected to a first portion of external communications bus cabling 460, which is connected to a first plurality of peripheral devices 450 located outside of the control panel enclosure 430, and a second side of the repeater 465 is connected to a second portion of external communications bus cabling 462, which is connected to a second plurality of peripheral devices 452 located outside of the control panel enclosure 430. Each of the control panel 410, communication devices 420 housed within the control panel enclosure 430, internal repeater 415, and the first plurality of peripheral devices 450 can communicate with each of the second plurality of peripheral devices 452 via the repeater 465. However, when the repeater 465 detects a transient fault or transient tampering or interference with the second portion of external bus cabling 462 or one of the second plurality of peripheral devices 452, the repeater 465 can isolate the second portion of external bus cabling 462 from the first portion of external bus cabling 460, thereby protecting the first portion of external bus cabling 460 from the transient fault or transient tampering or interference.

Figure 5:
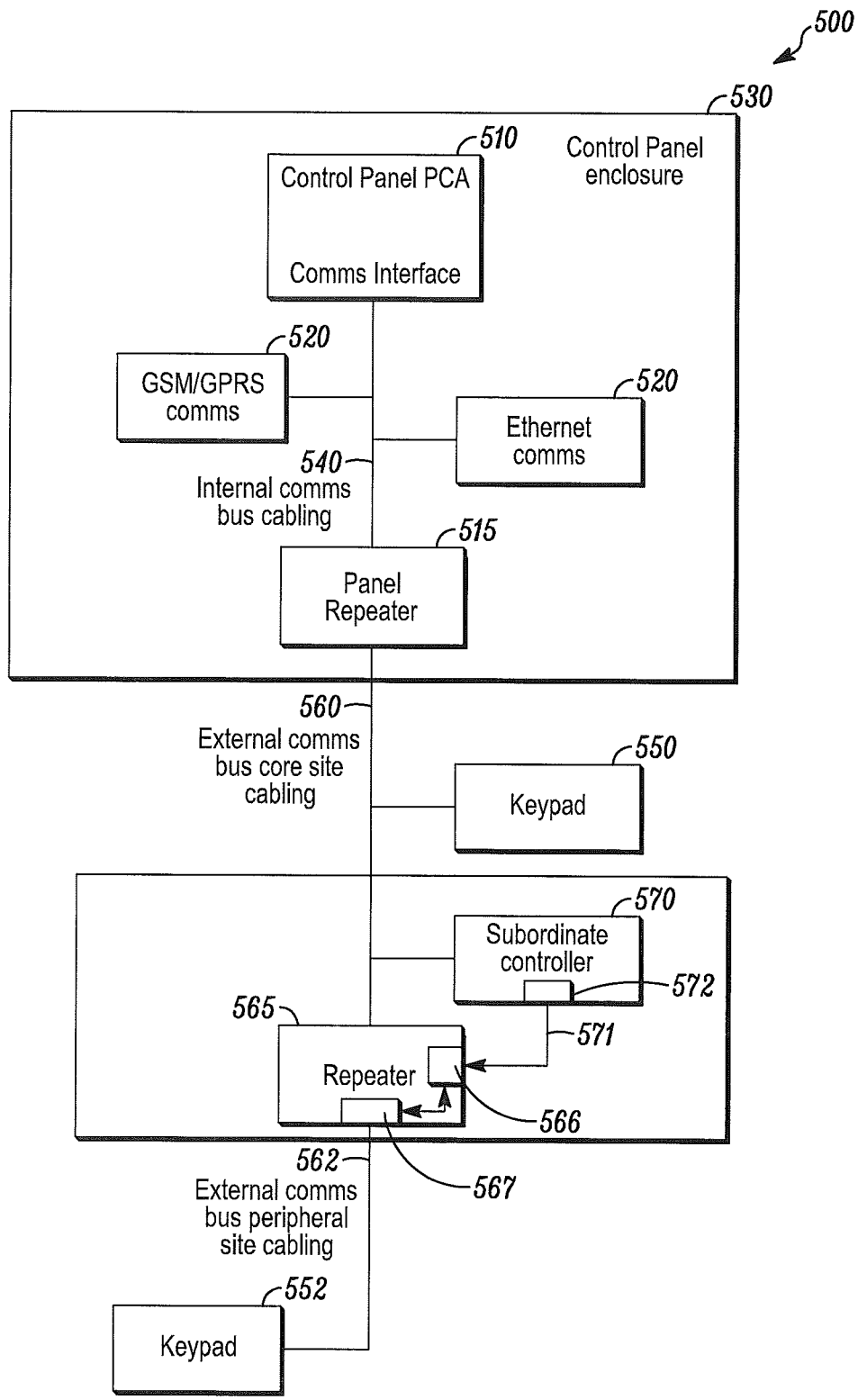
FIG. 5 is a block diagram of a system that includes a communications bus and internal and external communications bus line isolators in accordance with disclosed embodiments.

Finally, FIG. 5 is a block diagram of a system 500 that is similar to the system 300 of FIG. 3 except that the system 500 also includes an external repeater 565 such that a first side of the repeater 565 is connected to a first portion of external communications bus cabling 560, which is connected to a first plurality of peripheral devices 550 located outside of the control panel enclosure 530, and a second side of the repeater 565 is connected to a second portion of external communications bus cabling 562, which is connected to a second plurality of peripheral devices 552 located outside of the control panel enclosure 530. As seen in FIG. 5, the repeater 565 can also be connected to a subordinate controller 570 via a communications line 571, a controller output 572 that is dedicated to bus fault isolation, and circuits 566 in the repeater 565 that enable or disable external bus cabling receivers 567 of the repeater 565.

Each of the control panel 510, communication devices 520 housed within the control panel enclosure 530, internal repeater 515, and the first plurality of peripheral devices 550 can communicate with each of the second plurality of peripheral devices 552 via the repeater 565. However, when the repeater 565 detects any fault or tampering or interference with the second portion of external bus cabling 562 or one of the second plurality of peripheral devices 552, the repeater 565 can isolate the second portion of external bus cabling 562 from the first portion of external bus cabling 560, thereby protecting the first portion of external bus cabling 560 from transient faults or transient tampering or interference. Moreover, when the subordinate controller 570 detects a continuous fault on or continuous tampering or interference with the second portion of external bus cabling 562 or one of the second plurality of peripheral devices 552, the controller 570 can transmit a signal to the repeater 565 via the controller output 572, the communications line 571, and the circuits 566 of the repeater 565 instructing the repeater 565 to disable the external bus cabling receivers 567 of the repeater 565, thereby protecting the first portion of external bus cabling 560 from the continuous fault or continuous tampering or interference.

Although a few embodiments have been described in detail above, other modifications are possible. For example, the logic flows described above do not require the particular order described, or sequential order, to achieve desirable results. Other steps may be provided, or steps may be eliminated, from the described flows, and other components may be added to, or removed from, the described systems. Other embodiments may be within the scope of the invention.

From the foregoing, it will be observed that numerous variations and modifications may be effected without departing from the spirit and scope of the invention. It is to be understood that no limitation with respect to the specific system or method described herein is intended or should be inferred. It is, of course, intended to cover all such modifications as fall within the spirit and scope of the invention.

What is claimed is:

1. A system comprising:
   a first communications bus isolator;
   a first side of the first communications bus isolator coupled to a control panel via internal communications bus cabling and to a dedicated fault bus isolation output of the control panel via a communications line that is different than the internal communications bus cabling; and
   a second side of the first communications bus isolator coupled to at least one peripheral device via an external bus cabling receiver of the first communications bus isolator and external communications bus cabling,
   wherein, when the first communications bus isolator detects a transient or continuous fault on, transient or continuous tampering with, or transient or continuous interference with the external communications bus cabling or the at least one peripheral device, the first communications bus isolator isolates the internal communications bus cabling from the external communications bus cabling, and
   wherein, when the control panel detects the continuous fault on, the continuous tampering with, or the continuous interference with the external communications bus cabling or the at least one peripheral device, the control panel transmits a first signal to the first communications bus isolator, via the dedicated fault bus isolation output of the control panel and the communications line, instructing the first communications bus isolator to actively disable the external bus cabling receiver of the first communications bus isolator.

2. The system of claim 1 wherein the first communications bus isolator includes a communications bus repeater.

3. The system of claim 2 wherein the communications bus repeater includes a passive transparent communications bus repeater.

4. The system of claim 2 wherein, absent detection of the transient or continuous fault on, the transient or continuous tampering with, or the transient or continuous interference with the external communications bus cabling or the at least one peripheral device, the first communications bus repeater automatically passes second signals between the internal communications bus cabling and the external communications bus cabling.

5. The system of claim 1 wherein each of the control panel, the first communications bus isolator, and the internal communications bus cabling is housed within a control panel enclosure.

6. The system of claim 5 wherein each of the at least one peripheral device and the external communications bus cabling is located outside of the control panel enclosure.

7. The system of claim 5 further comprising:
   a second communications bus isolator that is coupled to first and second portions of the external communications bus cabling and that is located outside of the control panel enclosure.

8. The system of claim 1 wherein the first communications bus isolator detecting the transient or continuous fault on, the transient or continuous tampering with, or the transient or continuous interference with the external communications bus cabling or the at least one peripheral device includes the first communications bus isolator detecting a voltage transition indicative of the transient or continuous fault on, the transient or continuous tampering with, or the transient or continuous interference with the external communications bus cabling or the at least one peripheral device.

9. A system comprising:
   a first communications bus isolator;
   a first side of the first communications bus isolator coupled to a first portion of external communications bus cabling and to a dedicated fault bus isolation output of a subordinate controller via a communications line, the first portion of the external communications bus cabling being further coupled to a first plurality of peripheral devices and to internal communications bus cabling, the communications line being different than the internal communications bus cabling and the first portion of the external communications bus cabling; and
   a second side of the first communications bus isolator coupled to a second portion of the external communications bus cabling via an external bus cabling receiver of the first communications bus isolator, the second portion of the external communications bus cabling being coupled to a second plurality of peripheral devices,
   wherein, when the first communications bus isolator detects a transient or continuous fault on, or transient or continuous tampering with, or transient or continuous interference with the second portion of the external communications bus cabling or at least one of the second plurality of peripheral devices, the first communications bus isolator isolates the first portion of the external communications bus cabling from the second portion of the external communications bus cabling, and
   wherein, when the subordinate controller detects the continuous fault on, the continuous tampering with, or the continuous interference with the second portion of the external communications bus cabling or the at least one of the second plurality of peripheral devices, the subordinate controller transmits a first signal to the first communications bus isolator, via the dedicated fault bus isolation output of the subordinate controller and the communications line, instructing the first communications bus isolator to actively disable the external bus cabling receiver of the first communications bus isolator.

10. The system of claim 9 wherein the first communications bus isolator includes a communications bus repeater.

11. The system of claim 10 wherein the communications bus repeater includes a passive transparent communications bus repeater.

12. The system of claim 10 wherein, absent detection of the transient or continuous fault on, the transient or continuous tampering with, or the transient or continuous interference with the second portion of the external communications bus cabling or the at least one of the second plurality of peripheral devices, the first communications bus repeater automatically passes second signals between the first portion of the external communications bus cabling and the second portion of the external communications bus cabling.

13. The system of claim 9 wherein each of the first communications bus isolator, the first portion of the external communications bus cabling, the first plurality of peripheral devices, the second portion of the external communications bus cabling, and the second plurality of peripheral devices is located outside of a control panel enclosure.

14. The system of claim 13 wherein the internal communications bus cabling is housed within the control panel enclosure.

15. The system of claim 13 further comprising:
a second communications bus isolator housed within the control panel enclosure;
a first side of the second communications bus isolator coupled to the internal communications bus cabling; and
a second side of the second communications bus isolator coupled to the first portion of the external communications bus cabling.

16. The system of claim 9 wherein the first communications bus isolator detecting the transient or continuous fault on, the transient or continuous tampering with, or the transient or continuous interference with the second portion of the external communications bus cabling or the at least one of the second plurality of peripheral devices includes the first communications bus isolator detecting a voltage transition indicative of the transient or continuous fault on, or the transient or continuous tampering with, or the transient or continuous interference with the second portion of the external communications bus cabling or the at least one of the second plurality of peripheral devices.

\* \* \* \* \*